US006188973B1

(12) United States Patent
Martinez et al.

(10) Patent No.: US 6,188,973 B1
(45) Date of Patent: *Feb. 13, 2001

(54) AUTOMATIC MAPPING, MONITORING, AND CONTROL OF COMPUTER ROOM COMPONENTS

(75) Inventors: Reuben Martinez; Timothy Lieber, both of Colorado Springs; Timothy J. Morris, Fleming; Brian J. Purvis, Colorado Springs, all of CO (US)

(73) Assignee: Compaq Computer Corporation, Houston, TX (US)

( * ) Notice: Under 35 U.S.C. 154(b), the term of this patent shall be extended for 0 days.

This patent is subject to a terminal disclaimer.

(21) Appl. No.: 09/280,399

(22) Filed: Mar. 29, 1999

Related U.S. Application Data (63) Continuation of application No. 08/749,507, filed on Nov. 15, 1996, now Pat. No. 5,956,665.

(51) Int. Cl.[7] .............................. G05B 23/00; G05B 19/00
(52) U.S. Cl. ........................ 702/188; 345/349; 345/961; 340/825.07
(58) Field of Search .......................... 702/188; 345/349, 345/961; 340/825.07; 369/53

(56) References Cited

U.S. PATENT DOCUMENTS

| | | | |
|---|---|---|---|
| 4,575,714 | 3/1986 | Rummel | 340/568 |
| 4,754,397 | 6/1988 | Varaiya et al. | 395/182.05 |
| 4,903,194 | 2/1990 | Houdek et al. | 395/185.06 |
| 4,974,156 | 11/1990 | Harding et al. | 395/441 |
| 5,428,555 * | 6/1995 | Starkey et al. | 364/551.01 |
| 5,428,752 | 6/1995 | Goren et al. | 395/281 |
| 5,471,600 | 11/1995 | Nakamoto | 395/421.09 |
| 5,500,940 * | 3/1996 | Skeie | 395/183.01 |
| 5,555,390 | 9/1996 | Judd et al. | 395/421.07 |
| 5,581,201 | 12/1996 | Sonner et al. | 326/56 |
| 5,586,250 * | 12/1996 | Carbonneau et al. | 395/183.2 |
| 5,586,253 | 12/1996 | Green et al. | 395/185.06 |
| 5,606,664 * | 2/1997 | Brown et al. | 395/200.1 |
| 5,613,074 | 3/1997 | Galloway | 395/280 |
| 5,613,154 | 3/1997 | Burke et al. | 395/821 |
| 5,628,027 | 5/1997 | Belmont | 395/821 |
| 5,636,342 * | 6/1997 | Jeffries | 395/185.01 |
| 5,636,347 | 6/1997 | Muchnick et al. | 395/283 |
| 5,659,698 | 8/1997 | Weng et al. | 395/421.07 |
| 5,659,795 | 8/1997 | Duvall et al. | 395/835 |
| 5,684,671 * | 11/1997 | Hobbs et al. | 361/683 |
| 5,734,208 | 3/1998 | Jones | 307/139 |
| 5,790,782 | 8/1998 | Martinez et al. | 395/185.06 |
| 5,835,700 * | 11/1998 | Carbonneau et al. | 395/183.2 |
| 5,838,891 * | 11/1998 | Mizuno et al. | 395/182.03 |
| 5,848,230 * | 12/1998 | Walker | 395/182.05 |
| 5,850,539 * | 12/1998 | Cook et al. | 395/500 |
| 5,877,938 * | 3/1999 | Hobbs et al. | 361/724 |
| 5,892,973 | 4/1999 | Martinez et al. | 395/838 |
| 5,956,665 * | 9/1999 | Martinez et al. | 702/188 |

* cited by examiner

*Primary Examiner*—Patrick Assouad
(74) *Attorney, Agent, or Firm*—William J. Kubida; Hamilton, Smith et al.

(57) ABSTRACT

A system and method for automatically mapping on a computer display a graphical representation of a physical arrangement of a plurality of computer components in one or more cabinets, each cabinet having one or more shelves for housing the computer components. The status of the components is periodically monitored and the computer display updated accordingly. A graphical user interface is provided for user observation of the physical arrangement and status of computer components in the cabinets, as well as user control of the operational parameters of the components.

21 Claims, 8 Drawing Sheets

AUTOMATIC MAPPING, MONITORING, AND CONTROL OF COMPUTER ROOM COMPONENTS

RELATED APPLICATIONS

This is application is a Continuation of application Ser. No. 08/749,507 filed on Nov. 15, 1996 of Martinez et al., now U.S. Pat No. 5,956,665, which is related to co-pending, commonly assigned United States patent applications, the disclosures of which are expressly and specifically incorporated herein by reference in their entirety: "SYSTEM AND METHOD FOR DETERMINING ATTRIBUTES AND COUPLING CHARACTERISTICS OF COMPONENTS IN A COMPUTER SUBSYSTEM BACKPLANE" by T. Lieber and R. Martinez, Ser. No. 08/751,536 filed Nov. 15, 1996, herein after referred to as the "Determining Attributes application"; and "AUTOMATIC DISK DRIVE SHELF ADDRESS ASSIGNMENT AND ERROR DETECTION METHOD AND APPARATUS" by T. Lieber and R. Martinez, Ser. No. 08/746,739 filed Nov. 15, 1996, hereinafter referred to as the "Address Assignment application."

BACKGROUND OF THE INVENTION

1. Field of the Invention

This invention relates to the field of computer systems and computer mass storage devices and subsystems. More particularly, this invention relates to a system and method for automatically determining the physical location and operational status of components in a computer system, and mapping, monitoring, and controlling the same through a graphical user interface.

2. Description of Related Art

Computing systems employing mass storage devices conventionally have various components contained in numerous mutli-shelf cabinets in a computer room. These various components contained in the cabinets can include disk drives, controllers, power supplies, blower fans, monitoring modules, backplanes, etc., and are referred to generally as Field Replaceable Units (FRUs).

In managing the computing system, system administrators or other users often have a need for identifying a particular component present in the system, as well as the location and status of the component within the cabinets of the computing system. For instance, if a particular component is malfunctioning, it is desirable for the system administrator to have the ability to quickly and accurately determine the status of the component and locate the component within the computing system. It is also desirable to have this information available to a computer monitoring utility or graphical user interface (GUI).

In the past, components in a computing system have been identified by manually entering the components information into the system monitoring utility or GUI. The system monitoring utility or GUI is manually told what the system components are, how the components are configured into subsystem, and how the subsystems are configured into a full system. For example, the system administrator or some other person manually enters information about the cabinets (i.e., the number of shelves, shelf type, etc.) as well as the physical location of a given component within a cabinet.

This manual entry process is susceptible to human error, and can be very time consuming for large systems consisting of many components. Furthermore, when a component fails in a typical conventional system, the user or system manager or field service personnel must identify and manually search for the failed system component.

SUMMARY OF THE INVENTION

In accordance with this invention, the above problems have been solved by the present invention's system and method for a system monitoring utility or graphical user interface (GUI) to automatically determine and graphically represent the exact location of any system component within a shelf of a cabinet in the computing system. This information is extremely useful for system managers, field service personnel, and users to quickly and accurately identify components in the computing system, particularly failed components. Further, the status of the system is monitored and displayed by the GUI, and any changes in the system's physical configuration are detected. Finally, a user can issue commands to the GUI to locate a component in the system, or alter an operating setpoint of a component in the system.

In one embodiment of the invention, a method for automatically mapping on a computer display a graphical representation of the physical arrangement of a plurality of components of a computing system is disclosed. The method is comprised of initially detecting the presence of each component connected in said computing system, then determining a component attribute for each component detected. A cabinet attribute for each cabinets is also detected, the cabinet attribute containing a cabinet identification indicator and a cabinet type.

A unique address is then assigned to each component detected by the detecting step. The unique address corresponds to the physical location of each component in the cabinet. A graphical representation of the physical arrangement of the components in the cabinets is then generated on the computer display according to the unique address, the component attribute, and the cabinet attribute.

In another embodiment of the invention, the first determining step further reads a component type and a component version number for each component in the system. The second determining step further ascertains the number of shelves in each cabinets based on cabinet type information obtained from the cabinet attribute information.

In yet another embodiment of the invention, the first determining step reads a component status indicator corresponding to the operational status of each component. Additionally, any changes in the operational status of each component is monitored, and the computer display is updated with a graphical representation of the change in the operational status. The monitoring step can be implemented by periodically polling the components for a status flag of each components. The status flag has an indicator bit for each component indicating, when set, that a change in the operational status of the component has occurred. The status flag can be tested to determine if the status flag is active, and if so, the particular component referenced by the flag can be further queried for its respective status information.

Further, changes in the configuration of the system are detected by the present invention. The component attributes, such as the type of device and the version number, for each component installed in the shelves is monitored to detect any modification of the shelf's configuration, and the computer display is updated accordingly with a graphical representation of any modifications of the components installed therein.

In another embodiment of the invention, the method further comprises detecting a user command input to the computer display for controlling one of the components in the computing system. The control operations can include changing an operating setpoint of a component (i.e., a warning level for excessive temperature), or to flash an indicator light on a component so that the system administrator can more easily locate the component in the computing system.

The control functions are implemented as a method by identifying the unique address of the component sought to be controlled, forming a command message for transmission from the GUI or computer display device to the component at the unique address, and transmitting the command message to the component at the unique address.

In a system implementation of the invention, disclosed is a system for automatically mapping on a computer display a graphical representation of a physical arrangement of a plurality of computer components, the components arranged in one or more cabinets, each cabinet having one or more shelves for housing the components. The system has a monitoring device, a detecting module, attribute determining modules, an address assignment module, and a drawing module.

The monitoring device is installed in at least one shelf and is electrically connected to the components for communicating with the components. The monitoring device is adapted to communicate with a computer display. The detecting module detects the presence of each component connected in the computing system, while the component attribute determining module determines the component attributes for each of the components detected by the detecting module. The cabinet attribute determining module determines the cabinet attributes for each cabinet, these cabinet attribute include a cabinet identification indicator and a cabinet type. The address assignment module assigns a unique address to each one of the components detected by the detecting module, the unique address corresponding to the physical location of each component in the cabinet. The drawing module represents on the computer display the physical arrangement of the components in the cabinets according to their unique address, their component attribute, and the cabinet attribute.

A graphical user interface operates on the computer display device and is adapted to accept an input command from a user. The graphical user interface can have a monitoring module to monitor changes in the operational status of each component and update the computer display with a graphical representation of the change. The monitoring module can be implemented as a polling module, a checking module, and a querying module. The polling module periodically polls the components for a status flag of each the components, the status flag having an indicator for each one of the components indicating a change in the operational status of the component. The checking module tests if the status flag is active, and if so, the querying module queries the component for its newly changed operational status information.

The system can also detect changes in configurations of the computing system, such as when a component is removed. A component attribute monitoring module monitors any modification in the component attributes of each shelf, and updates the computer display with a graphical representation of the modification.

Further the GUI can issue commands to the components in the cabinet. An input detection module detects the input command for controlling one of the components in the computing system, an identification module identifies the unique address of the component, and a message encoding module forms a command message and transmits the command message from the GUI to the component at the unique address.

The great utility of the present invention is to automatically determine of the components present in the computing system, and to create a map of components and their locations, thereby reducing possible human error generally associated with conventional systems.

Still another utility of the present invention is that faults in the disk drives, FRUs, shelves, and cabinets can be monitored and physically located.

Yet another utility of the present invention is to allow a GUI to monitor and identify system configuration changes in real time.

The foregoing and other useful features and advantages of the invention will be apparent from the following more particular description of a preferred embodiment of the invention as illustrated in the accompanying drawings.

DETAILED DESCRIPTION OF PREFERRED EMBODIMENTS

The present invention is a system and method to monitor a computing system consisting of many components. Each component of the larger system is automatically identified as being present, and all of the component's associated attributes are determined. Each component is automatically mapped by a graphical user interface (GUI) to the component's physical location in the system. These features are referred to herein as "self-discovery" of the computing system. The status of each component is also continually monitored.

Further, a system monitor utility or GUI draws a graphical representation of computer room cabinets where each cabinet contains multiple shelves and multiple FRU components therein. In addition to indicating the physical location of a component within a particular shelf and cabinet, the GUI further provides real-time status information about the component being monitored.

If the location of the components changes in the system, then the GUI or other system monitoring utility identifies what has been changed within the system. For instance, any reconfiguration of cabinets, or shelves within a cabinet, or devices within a shelf, can be detected by the GUI as changed from the previous system configuration.

Figure 1:
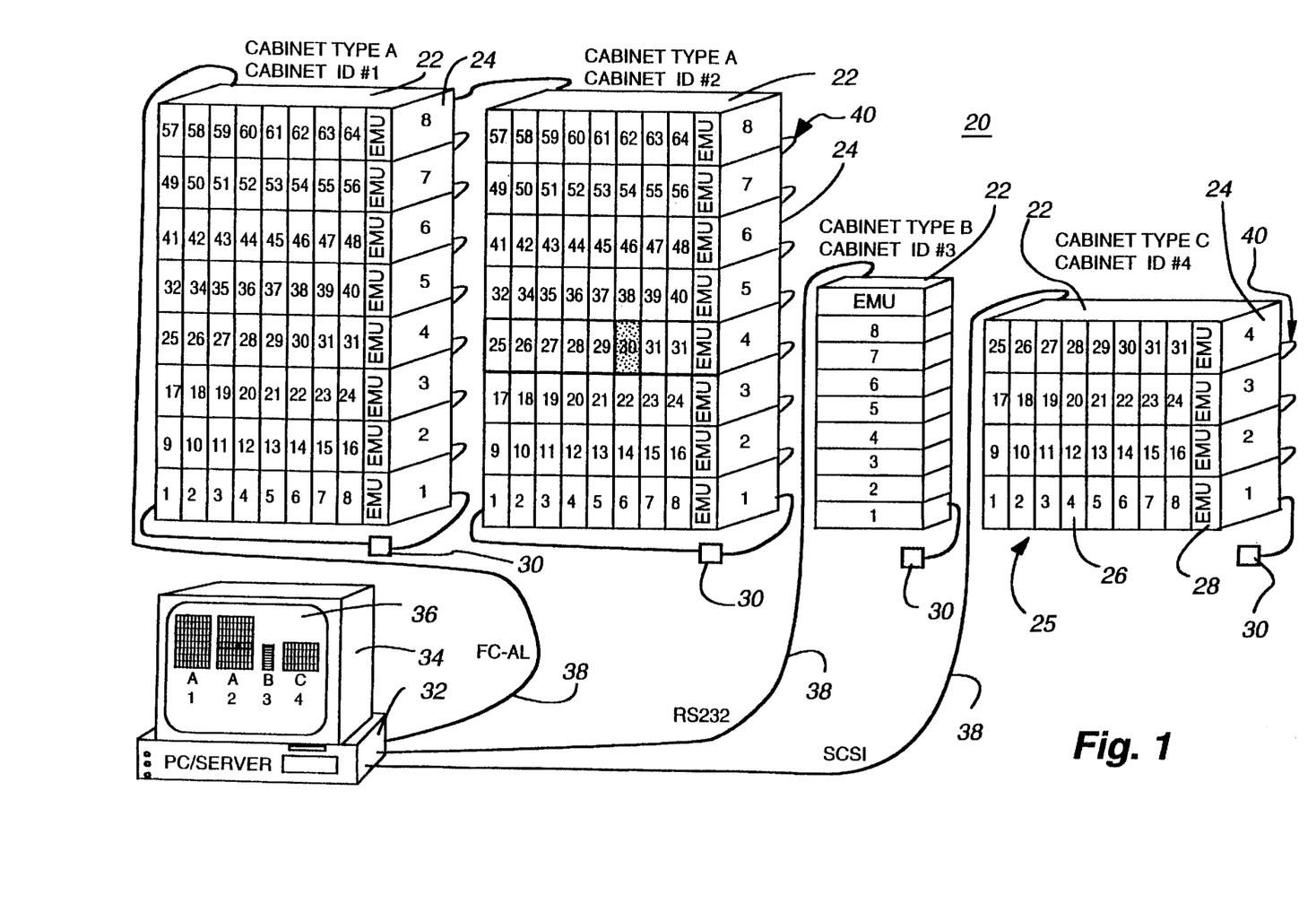
FIG. 1 is an illustration of multiple disk drives arranged in multiple cabinets in a computing system connected to a PC/server with a display running a graphical user interface (GUI) in accordance with the present invention.

As shown in FIG. 1, computing system 20 has various cabinets 22, each cabinet having one or more shelves 24, each shelf containing a variety of components 25 including disk drivers 26 and an environmental monitoring unit (EMU) 28. The disk drivers 26 are located in adjacently arranged slots of the shelf, as will be described below.

The EMU 28 is an intelligent device which monitors various attribute and status data of the components installed in a particular shelf, as well as environmental operating conditions of the shelf. The EMU also can act as a communications gateway to the GUI 36 to provide the GUI with needed component information. The EMU also is responsible for address assignments for components located in each shelf, as described in the co-pending "Address Assignment application."

Additionally, each cabinet has associated with it a cabinet identification (ID) box 30. The cabinet ID box 30 is used to provide the cabinet identification number, the cabinet type, and the reference address for the first shelf in the cabinet. As an example, in FIG. 1 there are four cabinets shown: Cabinet #1 of cabinet type A, having 8 shelves; Cabinet #2 of Type A, having 8 shelves; Cabinet #3 of Type B, having 1 shelf; and Cabinet #4 of Type C having 4 shelves.

To establish a unique cabinet ID number, the cabinet ID box can, for example, have a rotary switch for establishing a unique cabinet ID number (i.e., 1 to 1024 unique ID numbers) for setting by the system administrator prior to system initialization.

The cabinet ID box further provides the cabinet type information to the EMUs located within the cabinet. The cabinet ID box is integral to the cabinet and the cabinet type information is fixedly associated with each different cabinet type as a factory setting. The cabinet ID box uses the same analog signal encoding technique as described in the co-pending "Determining Attributes application", referenced above, for passing the cabinet type code (32 possible codes) to the EMUs of the cabinet.

Finally, the cabinet ID box 30 provides the reference shelf address to the first (lowest) shelf in the cabinet. Each shelf in the cabinet obtains a unique sequential shelf address for the cabinet. For example, in FIG. 1, Cabinet #1 has 8 shelves, and each shelf has a shelf address of 1 to 8 depending on the shelf's position within the cabinet, as described in the co-pending "Address Assignment application" referenced above.

As also shown in FIG. 1, a PC/server 32 having a display 34 is provided with a graphical user interface program (GUI) 36 operating thereon. As used throughout this application, the term "computer display" or "display" encompasses a passive computer display device, or a computer display system having a display 34 coupled to a computer 32 adapted to accept user input through a keyboard (not shown), a mouse device (not shown), or some other input device.

The operations of the GUI are described in greater detail in FIGS. 6–9. As shown in FIG. 1, the GUI provides a graphical representation of the cabinets 22, shelves 24, and components 25 of the computer system 20. The graphical representation of the computer system is such that a single component displayed on the GUI is mapped to, and can be located by, its physical location in the computer system based on the component's shelf position in the cabinet, and the cabinet ID number. FIG. 1 shows, for example, the GUI display of a highlighted disk drive in Cabinet #2 shelf #4 (in Cabinet type A) as mapping to the proper disk drive in the computer system. The operations of the GUI 36 will be described in greater detail below.

The GUI 36 obtains component and status information from the computing system 20 through communication links 38. There are a variety of ways in which the GUI can acquire information from the computing system 20. For instance, the PC/server could interface with a cabinet 22 through a fiber channel arbitrated loop (FC-AL), an RS232 connection to each shelf, or a SCSI bus connected to the cabinet. Any of these communication protocols/buses can be used by the PC/server to gather the relevant physical and logical information about the components of the cabinet. In FIG. 1, three communication links 38 are shown, for example, including a fiber channel arbitrated loop, an RS232 communications link, and a SCSI link. The communication link used in the particular system is a matter of choice dependent upon the communications requirement and compatibility of the various components located within the cabinets 22, as well as other factors such as the desired system throughput and performance.

Figure 2:
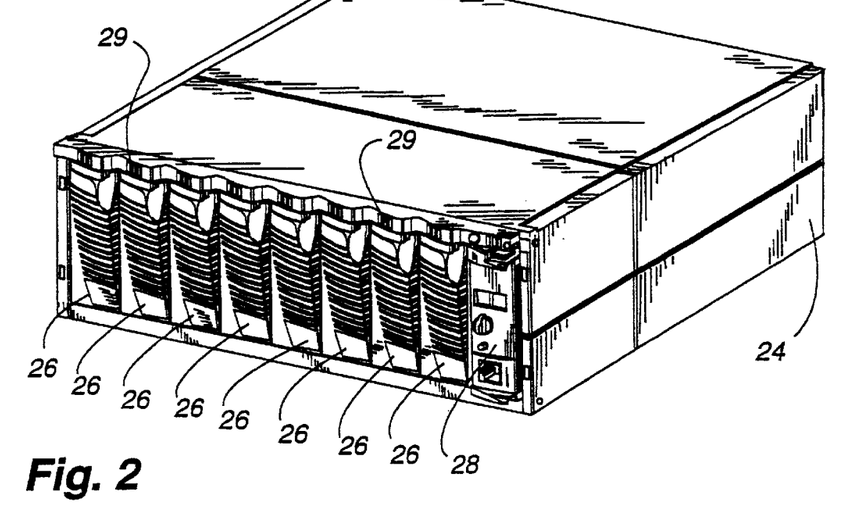
FIG. 2 is a front isometric view of a representative storage subsystem illustrating a shelf having an umber of disk drive modules and an environmental monitoring unit (EMU).

Referring to FIG. 2, a single shelf 24 is shown having a series of 8 adjacently-positioned removable disk drives 26 and an environmental monitoring unit 28. The disk drives 26 are electrically coupled to a subsystem back plane (not shown) to which the EMU 28 is also coupled. This entire shelf assembly 24 can be removably inserted into cabinet 22 (FIG. 1) to form a stackable set of shelves within the cabinet. Status lights 29 are associated with each disk drive 26 and with the EMU 28.

Figure 3:
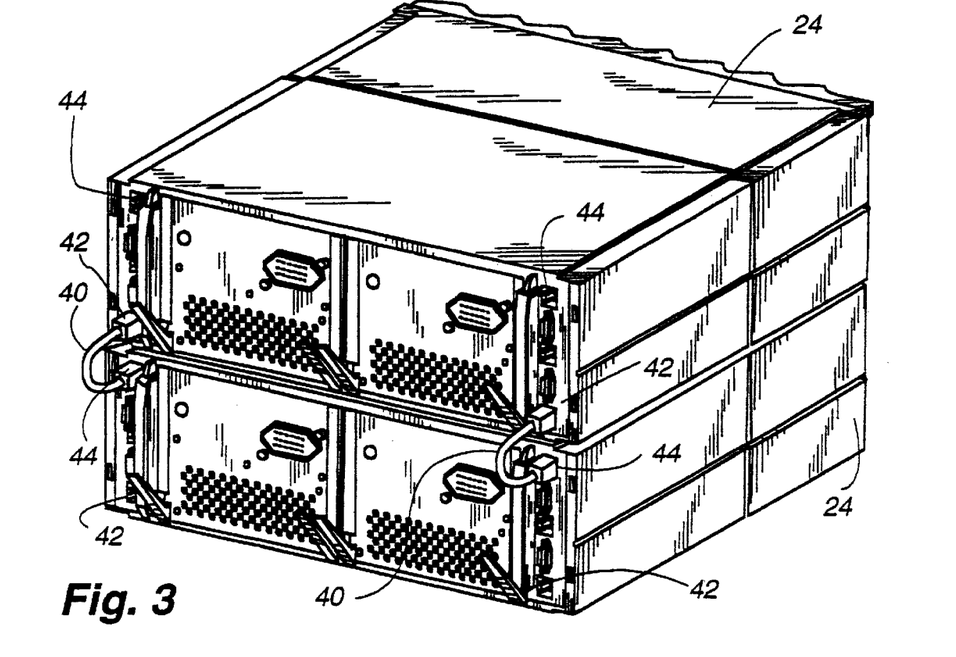
FIG. 3 is a rear isometric view of two of the shelves shown in FIG. 2 stacked upon each other and electrically connected together through two redundant shelf-to-shelf cables.

Referring now to FIG. 3, a rear view of two shelves 24 stacked vertically adjacent to each other is shown. The adjacent shelves within the cabinet are interconnected through shelf-to-shelf cables 40, also shown in FIG. 1. Referring to FIG. 3, each shelf 24 has a pair of lower jacks 42 and upper jacks 44. The pair of lower jacks 42 are internally interconnected to provide a level of redundancy in the event of a failure in one of the shelf-to-shelf cables. Likewise, the pair of upper jacks are internally interconnected within the shelf for the same purpose. As shown in FIG. 3, adjacent shelves are connected by installing shelf-to-shelf cable 40 form the upper jack 44 of the lower shelf to the lower jack 42 of the upper shelf.

Further, the length of the shelf-to-shelf cable 40 is sufficiently short so that it is not possible to connect the upper jack 44 of any shelf to any jack other than the lower jack 42 of the adjacent shelf stacked thereupon. The short length of shelf-to-shelf cable 40 provides a needed physical constraint that each shelf in a cabinets is stacked directly upon another shelf in the cabinet such that shelf addresses will always be sequential from 1 to in shelves.

Figure 4:
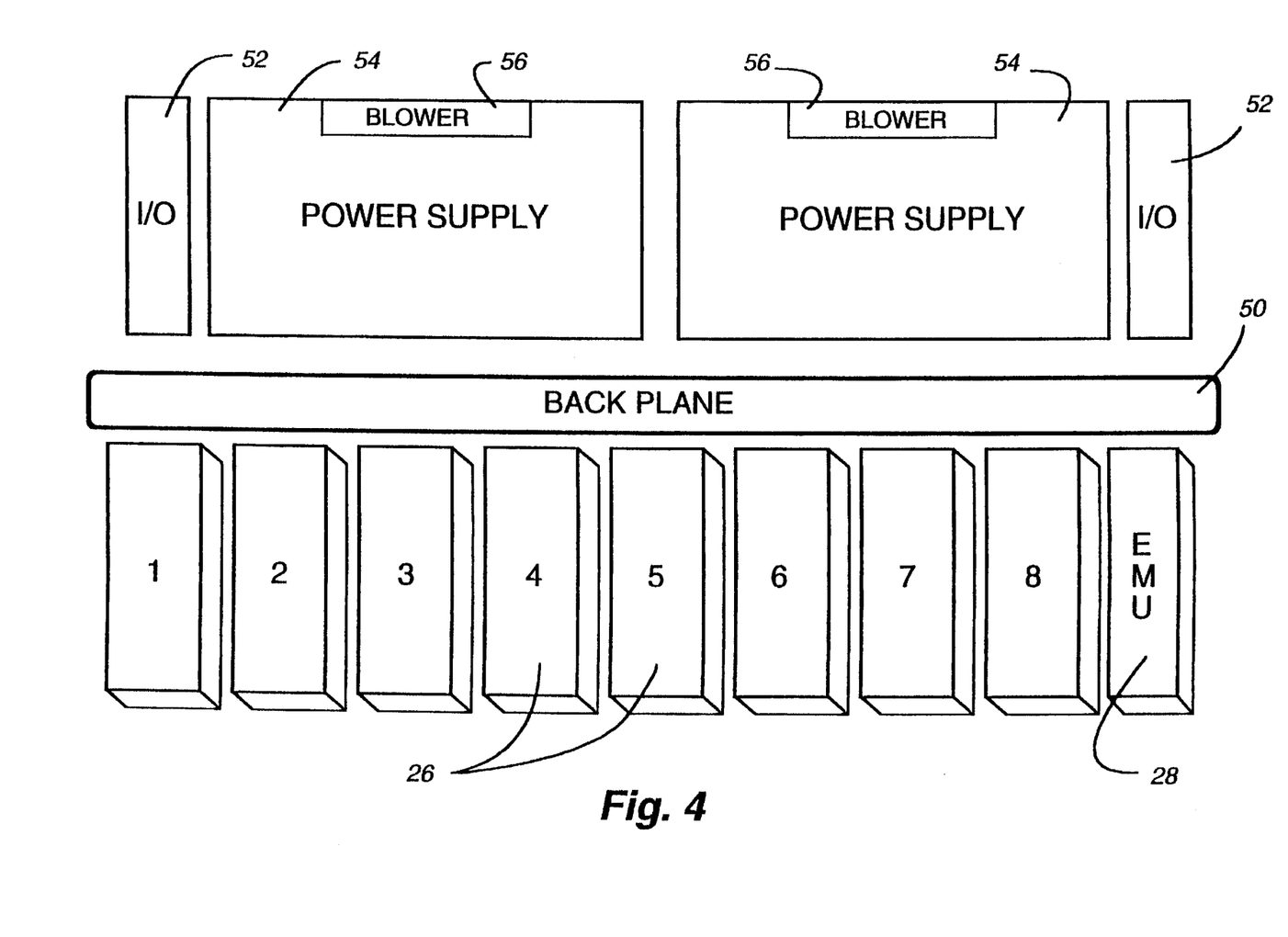
FIG. 4 is a simplified block diagram of the components within an individual shelf, illustrating the relative physical positioning of the disk drive modules, the EMU, power supplies with blower fans, I/O modules, and a back-plane connection block.

With reference now to FIG. 4, the internal physical layout of a shelf 24 is shown. A number of system components, alternatively known as field replaceable units (FRUs), include the disk drives 26 (eight drives are shown), the EMU 28, the shelf back plane 50, a pair of input/output modules 52, a pair of power supplies 54, and a pair of blower fans 56. The EMU 28 monitors various attribute and status data of these components as well as environmental operating conditions of the shelf, and assigns addresses for these components. For each component, the following attributes and variables are maintained: the worldwide or permanent name of the device, the presence or absence of the device within the cabinet, the type of device/model number, the operational status of the device, the version/revision code for the device, and the physical location or address of the device (including the slot number, shelf number, cabinet number, and cabinet type).

Figure 5:
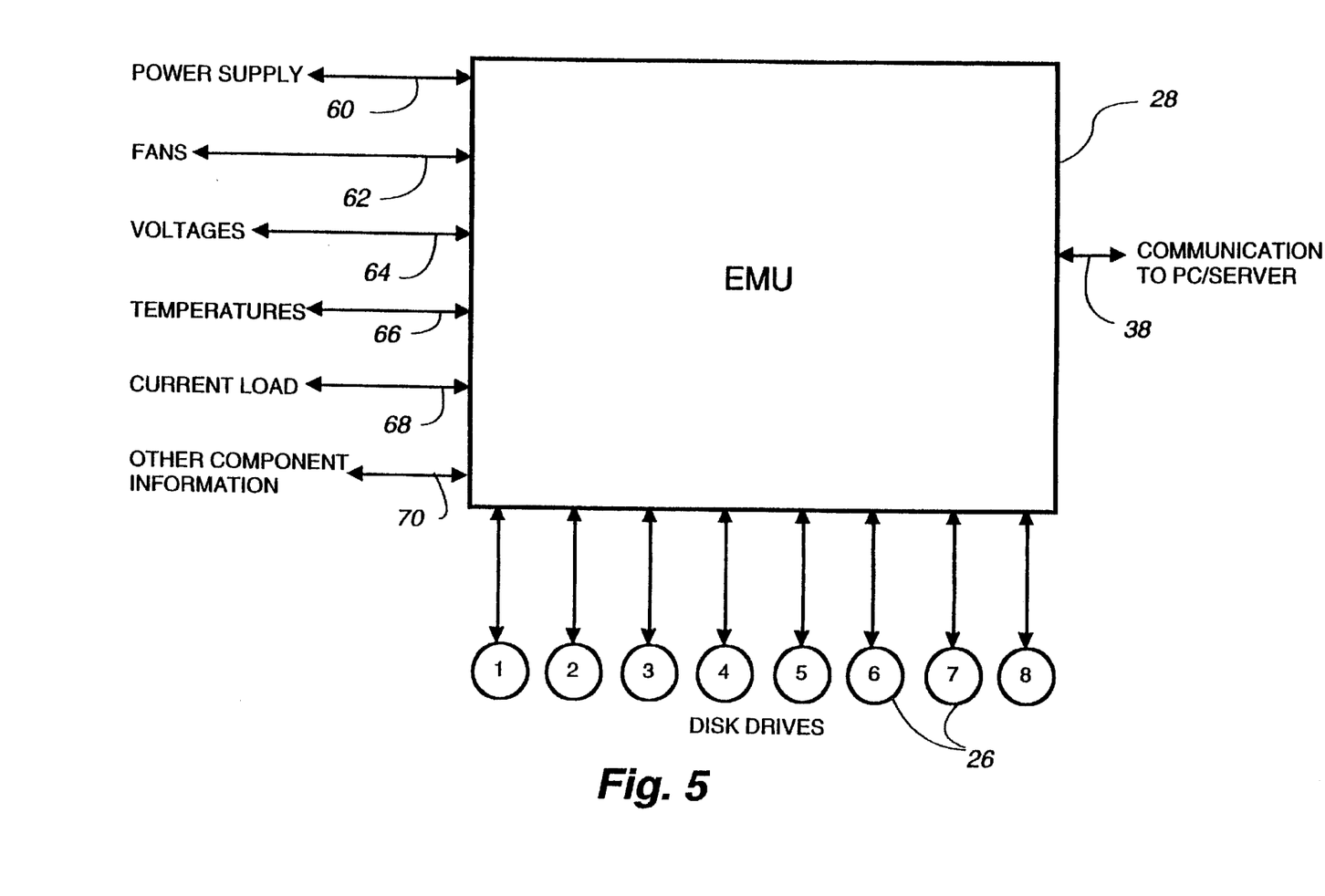
FIG. 5 is a block diagram of the EMU and associated shelf components and signals connected thereto.

As shown in FIG. 5, EMU 28 monitors various signals from the components within the shelf in which the EMU resides. Specifically, EMU 28 monitors a power supply signal 60, a fan signal 62, a supply voltage signal 64, a temperature signal 66, a current load signal 68, and other component signals 70. In addition, EMU 28 monitors the disk drives present within the particular shelf 24. This information monitored by the EMU is passed to the GUI 36 and PC/server 32 (FIG. 1) through communication link 38 for processing by the GUI 36.

In overall operation, the shelves 24 are mounted into a cabinet 22 starting from the bottom position and then each additional shelf installed above the previous shelf. Each shelf is then cabled only to the shelf above it and below it through the short shelf-to-shelf cables 40. All subsequent shelves are stacked thereon within the cabinet and are connected by the short shelf-to-shelf cables shown in FIG. 3. The short length of the shelf-to-shelf cables provides a physical constraint that governs the shelf configuration, in that any shelf subsequently connected to the first shelf cannot be physically located in a shelf position other than the next shelf position. In this manner, the shelves are stacked sequentially from the $1^{st}$ shelf to the $n^{th}$ shelf. Alternatively, if a shelf structure is utilized wherein short shelf-to-shelf connectors cannot be used, pairs of mating connectors uniquely adapted for each shelf location can be utilized so that each shelf is placed in a known location within the cabinet. In this manner, the physical location of the shelf within the cabinet is established as a known constant which ultimately can be communicated to the GUI.

Upon initialization, the first shelf is assigned the first shelf address by the cabinet ID box 30 and then all subsequent shelves are assigned addresses in sequential order by the previous shelf. The EMU 28 of each shelf obtains its shelf address based on its shelf position in the cabinet. The shelf address is read by the EMU through an analog voltage technique described in the "Address Assignment application" referenced above. Based on the shelf address that the MU obtains, the EMU then assigns addresses to each of the components detected in the slots of its shelf. In this manner, each slot in each shelf of the cabinet has an unique address reflecting the physical location of any device placed within that slot. For example, each EMU 28 assigns its disk drives 26 a corresponding device address.

In addition to accepting the first shelf address from the cabinet ID box 30, the EMU of the first shelf also obtains the cabinet type and cabinet identification assignment from the cabinet ID box 30. The EMU of the first shelf then notifies the EMUs of all other shelves within the same cabinet as to the cabinet type and cabinet address. The EMU of each shelf stores its shelf address assignment and cabinet information (cabinet type and cabinet identification number) into a non-volatile memory within the shelf so that any reconfiguration of shelves and cabinets can be determined by the GUI.

Each FRU component 25 or 26 (FIG. 1) within a shelf 24 also provides its attribute information (i.e., component type, revision/version number) to the EMU module 28 within the shelf so that the EMU knows exactly which components and how many components are present in the shelf, and the locations of the components in the shelf, as described in the "Determining Attributes application" referenced above.

Hence, the EMU for a given shelf has, upon system initialization, obtained information on the cabinet identification, cabinet type, shelf address, number of components active in the shelf, attribute information of components active in the shelf, and the respective addresses of each device in the shelf. In this manner, the computing system has been "self-discovered" in that each components of the computing system has been identified and assigned an address.

Based on the information obtained by the EMUs of each shelf, the GUI can query the EMUs for this same information so that the GUI can create a graphical representation of each of the cabinets, shelves, and components located therein. The GUI operations associated with this feature is described below with reference to FIGS. 6–7.

While the EMU 28 of each shelf reports the cabinet type to the GUI 36, the GUI should be provided a table containing general information on the physical attributes of each of the different cabinets types. These physical attributes can include the layout of the cabinet, as well as the maximum number of shelves that the cabinet will support. Upon the receipt of the cabinet type and cabinet ID number, the GUI can then draw the appropriate graphical representation of the cabinet, shelves, and devices. For example, in FIG. 1, Cabinet type A is an 8 shelf cabinet, while Cabinet type C is a 4 shelf cabinet.

The present invention further provides the GUI 36 with the ability to track changes in the configuration of the components of the computing system 20 (FIG. 1). Such reconfigurations can involve, for instance, the removal of an entire shelf of components or the removal of an individual disk drive or component from a given shelf. If the removed shelf or component is placed elsewhere in the system, the GUI will also accurately track the reinsertion of the component or shelf in anew location. For tracking changes in the location of a shelf, after the shelf-to-shelf addressing is complete upon initialization, the GUI automatically assigns a permanent name associated with each shelf, and this permanent name is written to the EEPROM of the EMU for the shelf. In order to track disk drives, an IEEE device name (64 bit) of the disk drive (provided by the disk drive manufacturer) is read by the GUI and stored within the PC/server 32. In this manner, the GUI can track the removal and subsequent reinstallation of any component of the computing system.

Further, a revision matrix file can be maintained by the GUI for determining any mismatches of device types. For instance, if in a given shelf type, the system administrator erroneously installs a power supply incapable of providing the necessary power to he cabinet components under loading conditions, the GUI would have the ability to notify the system administrator of the configuration mismatch based on the data contained in the revision matrix.

Since the EMU communicates the component information to the GUI, the GUI has access to the following information regarding a computer room:

Cabinet #n—present, type, address, operational status, physical location.
        power supply 1—present, type, revision, operational status, physical location
        power supply n—present, type, revision, operational status, physical location logic module 1—present, type, revision, operational status, physical location logic module n—present, type, revision, operational status, physical location I/O module 1—present, type, revision, operational status, physical location I/O module n—present, type, revision, operational status, physical location disk drive 1—present, type, revision, operational status, physical location disk drive n—present, type, revision, operational status, physical location FRU 1—present, type, revision, operational status, physical location FRU n—present, type, revision, operational status, physical location.

it is understood that the GUI would have access to this information for any number of cabinets and devices therein of the computing system.

Figure 6:
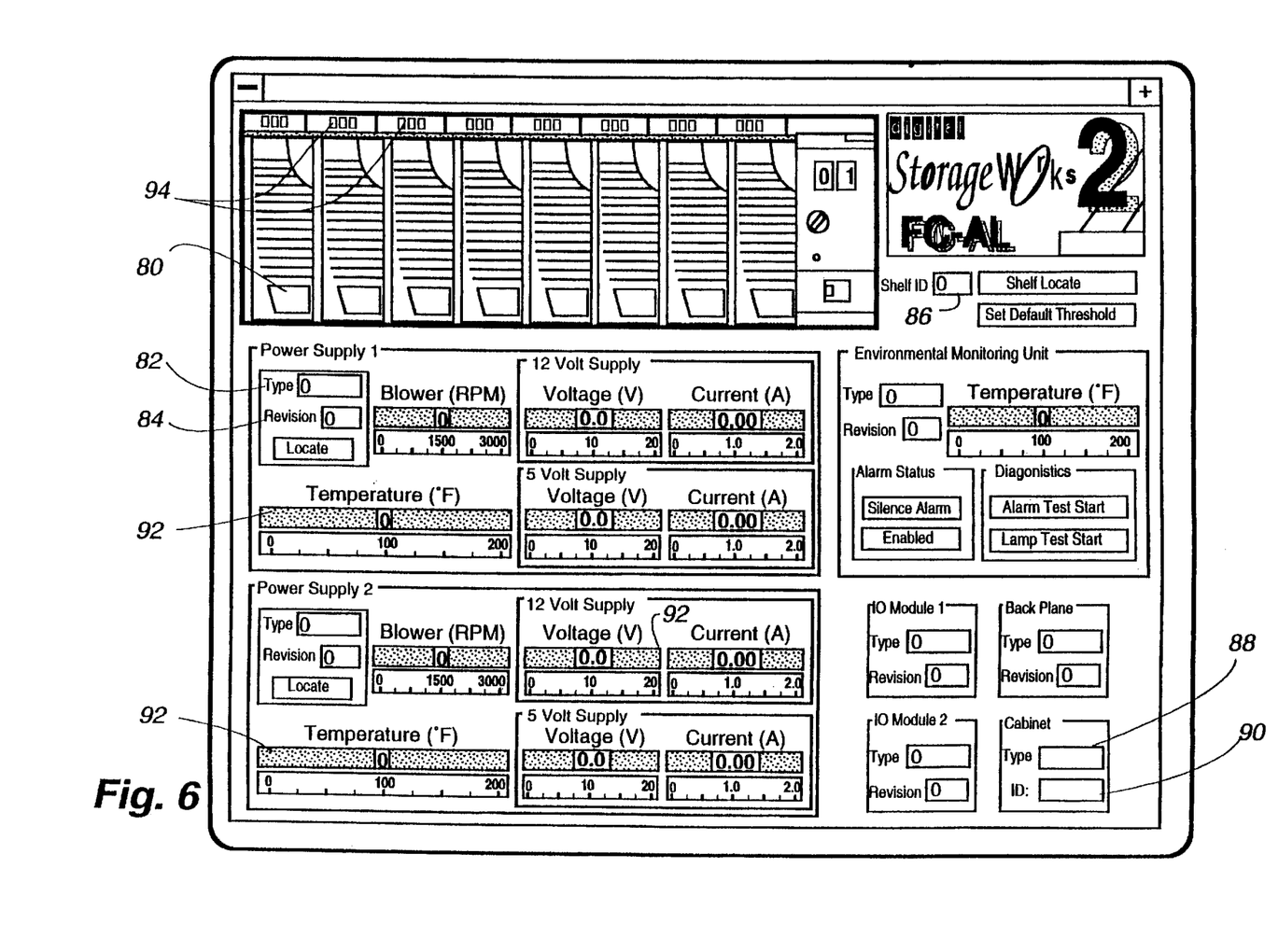
FIG. 6 is an example of a display screen generated by the GUI in accordance with the present invention; this example display screen graphically represents the physical location, status, and characteristics of the devices in a single shelf of the cabinet.

FIG. 6 illustrates an example of a screen display of the GUI 36. In FIG. 6, a graphical representation of a single shelf, along with the associated characteristics and the status of the components located within he shelf, is shown. Shelf display 80 is a graphical representation of the physical locations of each of the disk drives within the shelf. Furthermore, the various parameters such as the component type fields 82, component revision fields 84, the shelf ID field 86, the cabinet type field 88, and the cabinet ID field 90 are shown. Status light fields 94 emulate the current state of the status light 29 of FIG. 2.

Figure 7:
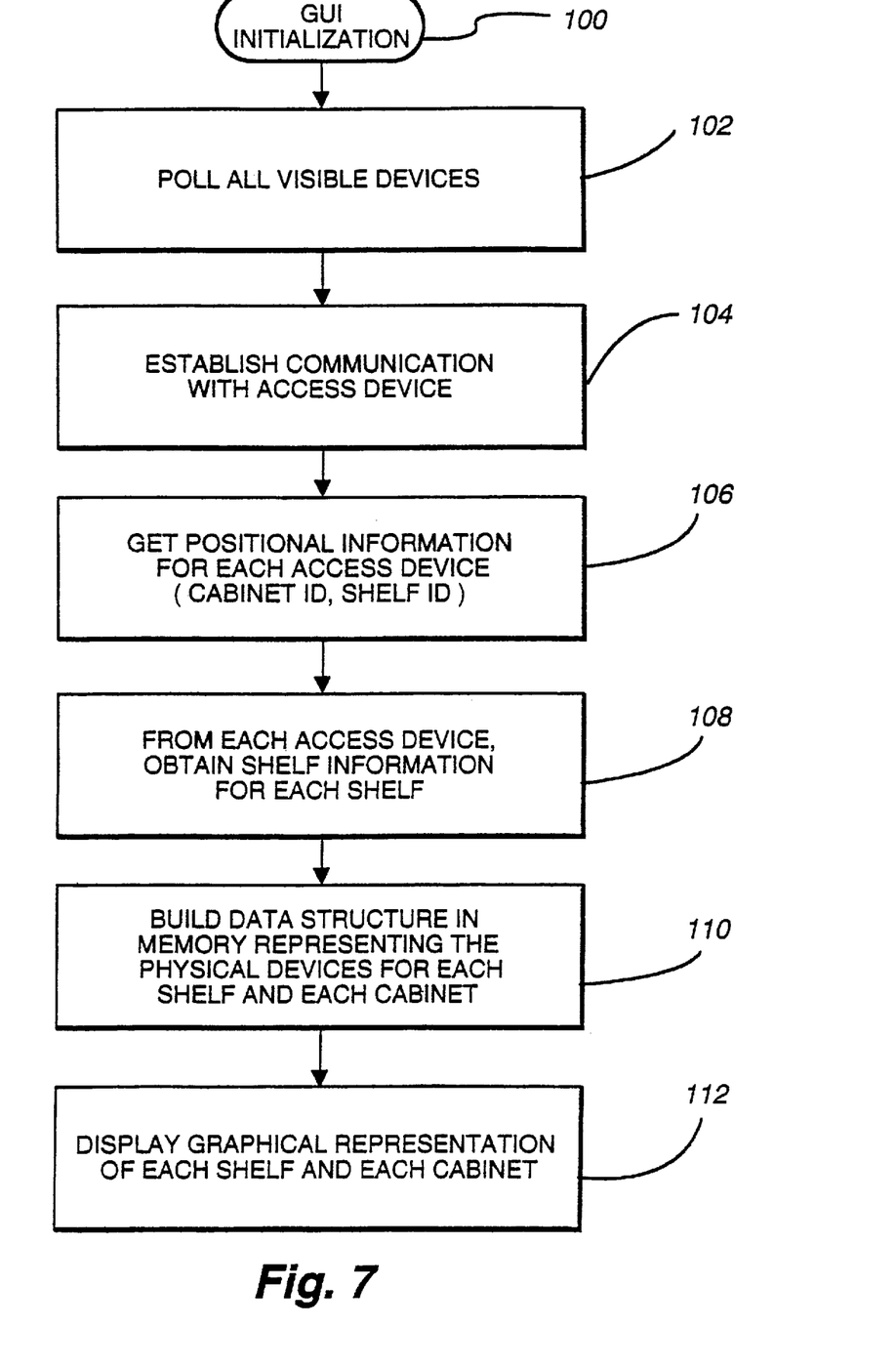
FIG. 7 is a logical flow diagram of the GUI initialization process for automatically self-discovering the components in the shelves of a cabinet and creating a graphical representation thereof.
Figure 8:
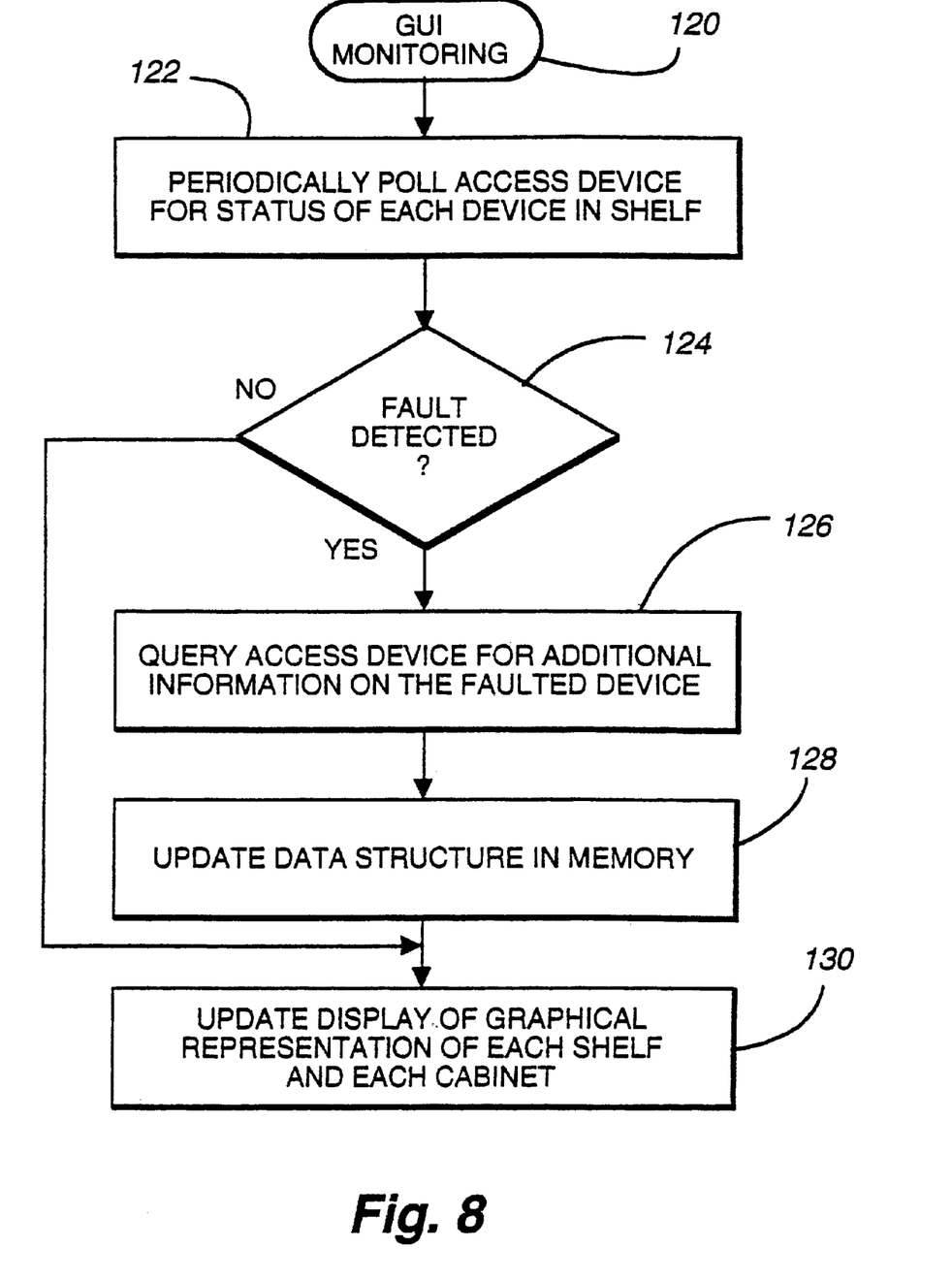
FIG. 8 is a logical flow diagram of the GUI monitoring process for updating the graphical representation with any newly changed component data.
Figure 9:
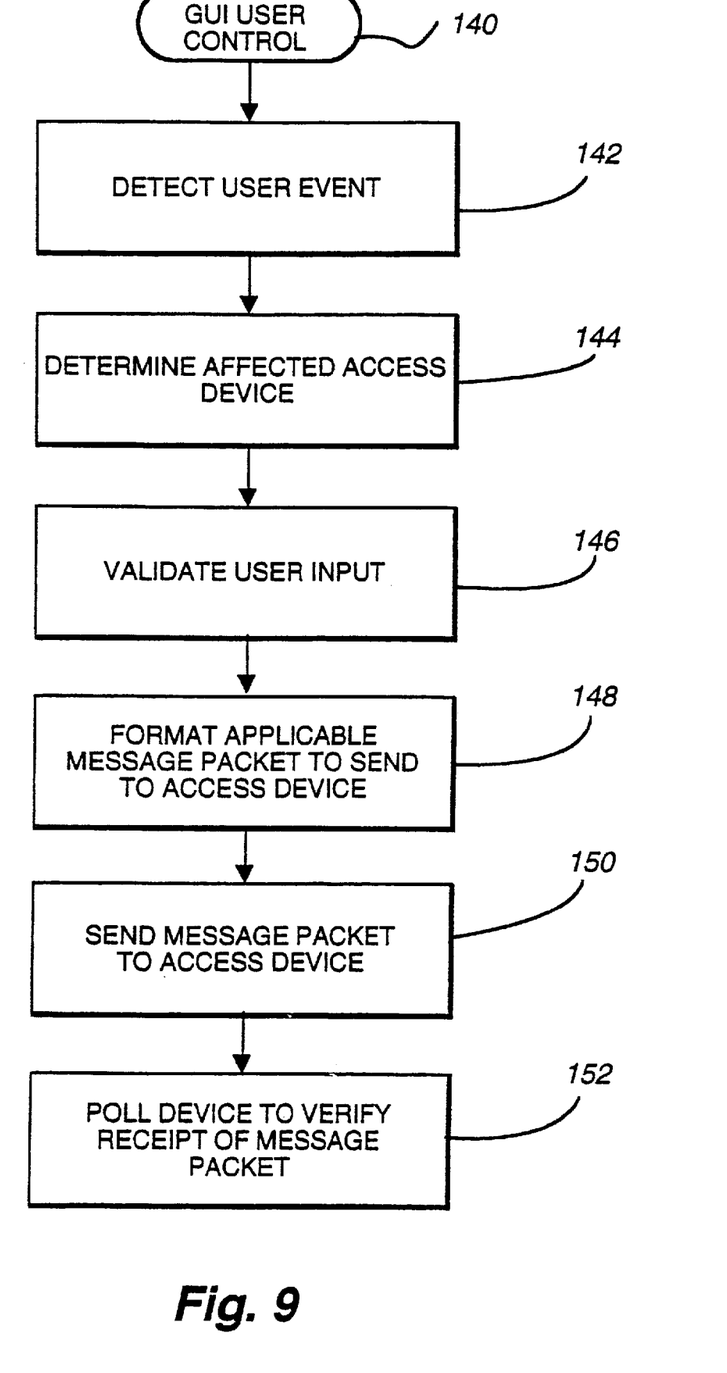
FIG. 9 is a logical flow diagram of the GUI user control function.

FIGS. 7–9 illustrate the logical operations of the GUI 36 in automatically determining and graphically representing the configuration of the computer system at power up, and detecting any subsequent changes to the system configuration.

The operating environment of the GUI can encompass a standalone computing system as well as a general distributed computing system. The computer program containing the mechanisms to effectuate the operation of the GUI 36 of the present invention may reside in a memory section of the PC/server 32, or on a disk storage unit, or on a CD ROM of such a system.

The embodiments of the GUI described herein are implemented as logical operations in a computing system. The logical operations of the present invention can be implemented (1) as a sequence of computer implemented steps running on the computing system, and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

FIG. 7 illustrates the logical operations to perform the self-discovery function of the GUI. Upon system initialization at operation 100, the GUI performs polling operation 102 to determine which visible devices are present in the entire computing system. Polling operation 102 would include a query from the PC/server 32 to the EMU's of each cabinet in the computing system.

Operation 104 establishes communications between the GUI and the access device within the shelf. In this sense, the "access" device is defined to mean the device which the GUI communicates with to obtain information from the EMU about the shelf. Hence, operation 104 would establish communications between the GUI and the appropriate access device to communicate with the EMU regarding each visible device located by polling operation 102 within the particular shelf.

Retrieval operation 106 obtains positional information for each access device with respect to its particular shelf and cabinet. In particular, the access device will report to the GUI its cabinet identification number and shelf I.D. number. This information is used by the GUI, as described below, to represent graphically the location of the access device, as well as associated devices in the same shelf, within the GUI display for the computing ssystem.

Operation 108 obtains, from each access device, the shelf information for each shelf including all device types which are installed in the shelf, the location of the devices within the shelf (i.e. the slot number address occupied), status information as to the power supplies and I/O's modules, and the back plane. The revision, type, and status of these components is additionally read by the GUI by operation 108.

Mapping operation 110 builds a data structure in the PCserver's memory representing the physical devices and their present status within each shelf and each cabinet of the computing system. While it is understood that this data structure can take a variety of different forms depending upon the particular implementation chosen, the information contained within the data structure is manipulated by the GUI so that a physical map of the computing system is created. This map would utilize cabinet layout table previously described as well as the address information and status information obtained for each shelf of each cabinet from retrieval operation 106 and operation 108.

Displaying operation 112 displays within the GUI a graphical representation of each shelf and each cabinet, as well as other status information, for the computing system. The graphical display is based on the results of the mapping operation 110. Again, it is understood that the particular form of the display and/or the layout of the information on the GUI can take a variety of forms depending upon the particular implementation. As previously described, FIG. 6 is one example of a graphical representation of a single shelf within a cabinet and its associated status information.

The operations illustrated in FIG. 7 and described above permit the GUI to "self-discover" the components present in the computing system, their respective attributes, and their operational status. FIG. 8 illustrates the logical operations performed by the GUI to continually monitor the status of the components within the computing system after the initial self-discovery operations of FIG. 7 have been performed.

Referring to FIG. 8, the GUI monitoring operations being at periodic polling operation 122, where the GUI periodically polls each access device for the status of each device in the shelves of the cabinets. In one embodiment of the invention, the access device maintains a summary message of each device within the shelf. This summary message contains a flag indicating whether or not the status of a particular device in the shelf has changed. In this manner, the GUI's periodic polling query can be responded to by the access device with a simple flags, message, thereby reducing the processing overhead imposed upon both the access device and GUI. A single bit flat is maintained for each component which is being monitored. If the component undergoes a change of status, then the flag bit is set indicating to the GUI that the component has new information which the GUI must acquire. When the GUI periodically polls the access devices for status information, the GUI receives a compact summary of the status of all of the components in the computing system. In this manner, the required processing overhead of the GUI for monitoring the status of the components is substantially reduced, as the GUI is not required to continually re-read redundant information which has not changed since the last moment when the GUI pulled the status of the component.

Fault checking decision operation 124 determines whether the access device has reported a change of status for any of the devices within the shelf. If fault checking operation 124 determines that the status of each device in the shelf is unchanged, then fault checking decision operation 124 passes control to display updating operation 130, explained below.

Otherwise, querying operation 126 queries the access device for additional information on the particular faulted device. The access device would then report the relevant new data to the GUI for subsequent processing and display by the GUI.

Updating operation 128 updates the GUI's data structure in memory with the new information obtained from querying operation 126.

Display updating operation 130 then updates the graphical representation of each shelf and each cabinet appropriately. In this manner, the GUI display is continually updated with the proper status information regarding the components in the computing system. It will be understood that the period of time chosen for periodic polling operation 122 is a matter of choice dependent upon many factors in the computing system, such as the expected amount of bus traffic, as well as the processing ability of the PC/server to handle the expected number of updates per periodic polling cycle.

A further feature of the present invention is the ability of the GUI to provide user control of the components within the computing system. In this sense, user control includes the ability of the user to, through a command issued to the GUI, adjust a warning or shutdown set point value. A set point value could include a temperature at which the power supply within the shelf disables output power to the shelf, for example. These thresholds can include a warning threshold, wherein the component generates a warning signal ultimately passed to the GUI, or a critical threshold wherein the component takes some critical action to prevent catastrophic system failures.

Yet another feature of the present invention is the ability to locate an individual component within the computing system. The locate function permits the user or system administrator to physically locate a component in the computing system through the flashing of a light located on the component (i.e., indicator light 29 shown in FIG. 2). Each component in the computing system has a status light indicator (such as an LED) which is externally controllable. With the locate function of the GUI, a user can instruct the GUI to locate an individual component within a cabinet, a shelf within the cabinet, or the cabinet itself. The GUI would formulate the appropriate message to transmit to the EMU of the shelf in the cabinet wherein the component is located. The EMU would then instruct the component to flash its optical indicator appropriately.

While this locate function would permit a system administrator to visually locate the component by its flashing visual indicator, the present invention reduces the burdens of locating a component within a large computing system, such as a computer room, since the GUI provides the system administrator with the cabinet ID number, the cabinet type, the shelf number, and the slot number of the device being located. Therefore, the system administrator is not required to search through all of the cabinets in the computing system to locate the component with the flashing light.

The locate feature is ideally suited for locating a particularly type of device within the computing system. For instance, if a particular type of power supply needs replacement throughout the computing system, the locate function of the GUI would easily indicate to the system administrator which cabinets contain the power supply to be replaced.

FIG. 9 illustrates the logical operations of the present invention to provide for user control, through the GUI, of component operations. Event detection operation 142 detects a user initiated event directed toward the GUI. These events can include a mouse button depression or release, or user input through the PC/server's keypad. Based on the user's input, operation 144 determines the affected device as well as the affected access device. Input validation operation 146 then validates the user input to determine if the input falls within valid ranges for the affected device. For instance, a negative blower speed RPM value would be rejected as invalid user input by validation operation 146.

Assuming valid user input, message formation operation 148 formats an applicable message packet to be sent to the access device determined by operation 144. The format of the particular message will be dependent upon the communication's protocol as well as the message protocol utilized by the access device.

Transmission operation 150 sends the message packet, formed by message formation operation 148, to the affected access device. In the case of a locate function, the message packet would direct the access device to issue a command to the component in the shelf to activate a light on the component. In the case of a set point value, the message packet would direct the EMU to retain a new set point value in its memory.

Hence, operations 142–150 permit the user to transmit control messages to the components located within the shelves of the cabinets of the computing system. Operation 152 optionally polls the affected device to verify the receipt of the message packet. This operation is optional because, as previously discussed, the GUI monitoring operations shown in FIG. 8 would generally detect the change in the status of the particular device, thereby providing user feedback indicating that the desired change had in fact occurred.

By providing an automatically generated graphical representation of the location and status of components of a computer system, the present invention permits system administrators, field service personnel, and users to quickly and accurately identify a failed component—such as a failed blower, disk drive, or EMU—along with the component's location in the computer system. This is particularly advantageous where there are many components contained within multiple cabinets in a large computer room.

It can be seen that the present invention could be utilized to monitor the components within a single computer room, or multiple computer rooms, through the use of a single PC/server with the GUI operating thereon.

While the invention has been particularly shown and described with reference to preferred embodiments thereof, it will be understood by those skilled in the art that various other changes in the form and details may be made therein without departing from the spirit and scope of the invention.

What is claimed is:

1. An apparatus for determining a location of a specified disk drive within an arrangement of a plurality of disk dries, comprising:
   a computer system having a communications interface coupled to each of said plurality of disk drives;
   a plurality of status light indicators each of which is physically connected to a different one of said plurality of disk drives; and
   a graphical user interface, executing on said computer system, said graphical user interface selectively generating a message that is conveyed to circuitry coupled to a status light indicator associated with said specified disk drive such that the status light indicator is illuminated.

2. The apparatus for determining a location of said specified disk drive, as descried in claim 1, wherein each of said status light indicators is an LED that is disposed on a surface of the associated disk drive that can be visually monitored by a system administrator.

3. The apparatus for determining a location of said specified disk drive, as described in claim 2 wherein said status light indicator associated with said specified disk drive is illuminated in conjunction with said graphical user interface displaying a cabinet identification, a cabinet type, a shelf number and a slot number of said specified disk drive such that the system administrator can locate said specified disk drive.

4. The apparatus for determining a location of said specified disk drive, as described in claim 3, wherein said illumination of said status light indicators is also used to locate components that are associated with said specified disk drive.

5. The apparatus for determining a location of said specified disk drive, as described in claim 4, wherein said graphical user interface conveys said message to circuits associated with each of said status light indicators that are associated with a disk drive that has similar predetermined characteristics to said specified disk drive.

6. The apparatus for determining a location of a specified disk drive within an arrangement of a plurality of disk drives, comprising:
   a computer system having a means for communicating information to and from each of said plurality of disk drives;
   means for visually indicating a location of said specified disk drive coupled to each of said plurality of disk drives; and
   a user interface means, executing on said computer system, for receiving an indication of said specified disk drive, said user interface means comprising means for conveying a message to said visual indication means such that said visual indication means allows a system administrator to determine said location of said specified disk drive.

7. The apparatus for determining said location of said specified disk drive, as described in claim 6, wherein said visual indication means comprises a status light indicator and related circuitry, said status light indicator being disposed on a surface of aid specified disk drive that can be visually monitored by the system administrator.

8. The apparatus for determining said location of said specified disk drive, as described in claim 7, wherein said status light indicator is an LED at is illuminated in conjunction with said user interface means displaying location information associated with said specified disk drive.

9. The apparatus for determining said location of said specified disk drive, as described in claim 8, wherein said status light indicator is further illuminated to locate components that are associated with said specified disk drive.

10. The apparatus for determining said location of said specified disk drive, as described in claim 9, wherein said user interface means conveys a message to said visual indication means such that locations of ones of said plurality of disk drives having similar predetermined characteristics are indicated.

11. A method for determining a location of a specified disk drive within an arrangement of a plurality of disk drives, comprising the steps of:
   executing a graphical user interface application on a computer system;
   receiving, by said graphical user interface, an indication of said specified disk drive;
   generating, by said graphical user interface, a first message that is conveyed to a status light indicator disposed on said specified disk drive; and
   illuminating said status light indicator, responsive to said message, such that said location of said specified disk drive is determined.

12. A method for determining a location of a specified disk drive, as described in claim 11, further comprising the steps of:
   determining ones of said plurality of disk drives that have similar characteristics;
   conveyed a second message to plurality of status light indicators that are disposed on said disk dries having similar characteristics;
   illuminating said status light indicators disposed on said disk drives having similar characteristics in response to said second message.

13. A method for determining a location of a specified disk drive, as described in claim 12, wherein each of said status light indicators is an LED that is disposed on a surface of an associated disk drive that can be visually monitored by a system administrator.

14. A method for determining a location of a specified disk drive, as descried in claim 13, wherein said status light indicator associated with said specified disk drive is illuminated in conjunction with said graphical user interface displaying a cabinet identification, a cabinet type, a shelf number and a slot number of said specified disk drive such that said system administrator can locate said specified disk drive.

15. A method for determining a location of a specified disk drive, as described in claim 14, wherein said illuminating of said status light indicators is also used to locate components that are associated with said specified disk drive.

16. A system for providing status information associated with a specified disk drive that is located within an arrangement of a plurality of disk drives, comprising:
   a plurality of physical locations wherein said plurality of disk drives are located, each of said physical locations having an identification address;
   a monitoring unit, having an electrical connection to each of said physical locations such that status information associated with each of said plurality of disk drives can be retrieved, said status information including said identification address of each physical location and a corresponding permanent address of a disk drive that is located at that physical location;
   a computer system, having a communications interface connected to said monitoring unit for receiving said status information; and
   a computer program, executing on said computer system, for tracking changes in the physical location of said specified disk drive by monitoring said status information.

17. A system for providing status information associated with a specified disk drive, as described in claim 16, further comprising:
- an address assignment module for assigning a unique address to each one of said plurality of disk drives that are detected, by a detecting module, to be located in one of said plurality of physical locations, said unique address corresponding to the physical location of each one of said disk drives; and
- a drawing module portion of said computer program for representing said physical arrangement of said plurality of disk drives on said computer display.

18. A system for providing status information associated with a specified disk drive, as described in claim 17, wherein said computer program is a graphical user interface.

19. A system for providing status information associated with a specified disk drive, as described in claim 18, wherein said graphical user interface further comprises:
- a polling module for periodically polling each of said plurality of disk drives to retrieve a status flag, said status flag having an indicator for each one of said plurality of disk drives indicating a change in said operational status of any one of said plurality of components;
- a checking module for testing if said status flag is active; and
- a querying module for querying said one of said plurality of components for said operational status.

20. A system for providing status information associated with a specified disk drive, as described in claim 19, wherein aid graphical user interface further comprises:
- a component attribute monitoring module for monitoring a modification in said component attribute for each of said plurality of components installed in each of said one or more shelves and for updating said computer display with a graphical representation of said modification in said component attribute.

21. A system for providing status information associated with a specified disk drive, as described in claim 16, wherein said monitoring unit is located on a shelf containing a predetermined number of said physical locations wherein said plurality of disk drives are located.

* * * * *

UNITED STATES PATENT AND TRADEMARK OFFICE
CERTIFICATE OF CORRECTION

PATENT NO.   : 6,188,973 B1
DATED        : February 13, 2001
INVENTOR(S)  : Martinez et al.

It is certified that error appears in the above-identified patent and that said Letters Patent is hereby corrected as shown below:

Claim 1,
Line 59, "dries" should read --drives--

Claim 2,
Line 6, "descried" should read --described--

Claim 7,
Line 48, "aid" should read --said--

Claim 12,
Line 20, "dries" should read --drives--

Claim 20,
Line 7, "aid" should read --said--

Signed and Sealed this

Seventh Day of August, 2001

*Attest:*

*Attesting Officer*

NICHOLAS P. GODICI
*Acting Director of the United States Patent and Trademark Office*